(12) United States Patent
Takase et al.

(10) Patent No.: US 10,301,992 B2
(45) Date of Patent: May 28, 2019

(54) HEATER AND HONEYCOMB STRUCTURE INCLUDING HEATER

(71) Applicant: NGK INSULATORS, LTD., Nagoya (JP)

(72) Inventors: Naoya Takase, Nagoya (JP); Yoshimasa Kobayashi, Nagoya (JP); Yasuho Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/426,387

(22) Filed: Feb. 7, 2017

(65) Prior Publication Data
US 2017/0276047 A1    Sep. 28, 2017

(30) Foreign Application Priority Data
Mar. 28, 2016  (JP) ................. 2016-063134

(51) Int. Cl.
*F01N 3/20*    (2006.01)
*B01D 53/94*   (2006.01)
(Continued)

(52) U.S. Cl.
CPC .......... *F01N 3/2026* (2013.01); *B01D 53/944* (2013.01); *B01D 53/9454* (2013.01); *B01D 53/9495* (2013.01); *B01J 35/04* (2013.01); *F01N 3/101* (2013.01); *F01N 3/2013* (2013.01); *F01N 3/2842* (2013.01); *H05B 3/265* (2013.01); *H05B 3/42* (2013.01); (Continued)

(58) Field of Classification Search
CPC ...... F01N 3/301; F01N 3/2842; F01N 3/2026; F01N 3/101; B01D 2255/1023; B01D 2255/1025

USPC ........ 422/174, 177, 180; 219/530, 535, 541, 219/544
See application file for complete search history.

(56) References Cited

U.S. PATENT DOCUMENTS 3,748,439 A * 7/1973 Ting ................. H01C 1/084
219/205
4,733,056 A    3/1988 Kojima et al.
(Continued)

FOREIGN PATENT DOCUMENTS

DE         36 45 397 B4    8/2005
DE    10 2008 007 664 A1   8/2009
(Continued)

OTHER PUBLICATIONS

German Office Action (with English translation), German Application No. 10 2017 202 100.4, dated Nov. 7, 2017 (13 pages).

*Primary Examiner* — Tom P Duong
(74) *Attorney, Agent, or Firm* — Burr & Brown, PLLC

(57) ABSTRACT

A heater includes: a plate-like first heater substrate; an electrical heating wire that is provided on a first surface of the first heater substrate in a parallel circuit; electrodes that are connected to the electrical heating wire to allow current to flow in the electrical heating wire; and a plate-like cover substrate that covers the first surface of the first heater substrate, the electrical heating wire, and the electrodes with a second surface thereof. The electrical heating wire of the heater generates heat, so that the amount of heat is supplied. A honeycomb structure includes at least one heater that is provided so as to surround an outer wall thereof.

11 Claims, 11 Drawing Sheets

(51) Int. Cl.
*B01J 35/04* (2006.01)
*F01N 3/10* (2006.01)
*F01N 3/28* (2006.01)
*H05B 3/26* (2006.01)
*H05B 3/42* (2006.01)

(52) U.S. Cl.
CPC ............... *B01D 2255/1021* (2013.01); *B01D 2255/1023* (2013.01); *B01D 2255/1025* (2013.01); *B01D 2255/2073* (2013.01); *B01D 2255/20738* (2013.01); *B01D 2255/20761* (2013.01); *B01D 2255/915* (2013.01); *B01D 2255/9155* (2013.01); *B01D 2258/01* (2013.01); *F01N 2240/16* (2013.01); *H05B 2203/014* (2013.01); *H05B 2203/024* (2013.01); *H05B 2214/03* (2013.01); *Y02T 10/26* (2013.01)

(56) References Cited

U.S. PATENT DOCUMENTS

| | | | | |
|---|---|---|---|---|
| 4,849,611 A | * | 7/1989 | Whitney | H05B 3/141 219/448.11 |
| 5,446,264 A | * | 8/1995 | Kondo | F01N 3/2026 219/205 |
| 5,614,155 A | * | 3/1997 | Abe | F01N 3/2013 422/174 |
| 5,888,456 A | * | 3/1999 | Hashimoto | F01N 3/2026 422/174 |
| 6,037,574 A | * | 3/2000 | Lanham | H05B 3/28 219/390 |
| 2006/0011602 A1 | | 1/2006 | Konishi et al. | |
| 2007/0221661 A1 | * | 9/2007 | Nagasako | B23K 35/3006 219/544 |
| 2007/0251938 A1 | * | 11/2007 | Lin | H05B 3/143 219/443.1 |
| 2011/0073586 A1 | | 3/2011 | Lim et al. | |
| 2016/0011060 A1 | * | 1/2016 | Bergen | G01K 11/32 219/444.1 |
| 2016/0059669 A1 | | 3/2016 | Sagou et al. | |

FOREIGN PATENT DOCUMENTS

| | | |
|---|---|---|
| DE | 11 2014 001 661 T5 | 12/2015 |
| JP | S54-109536 A | 8/1979 |
| JP | 2010-229976 A1 | 10/2010 |
| JP | 2012-241548 A1 | 12/2012 |
| JP | 2014-190190 A | 10/2014 |

* cited by examiner

FIG.9
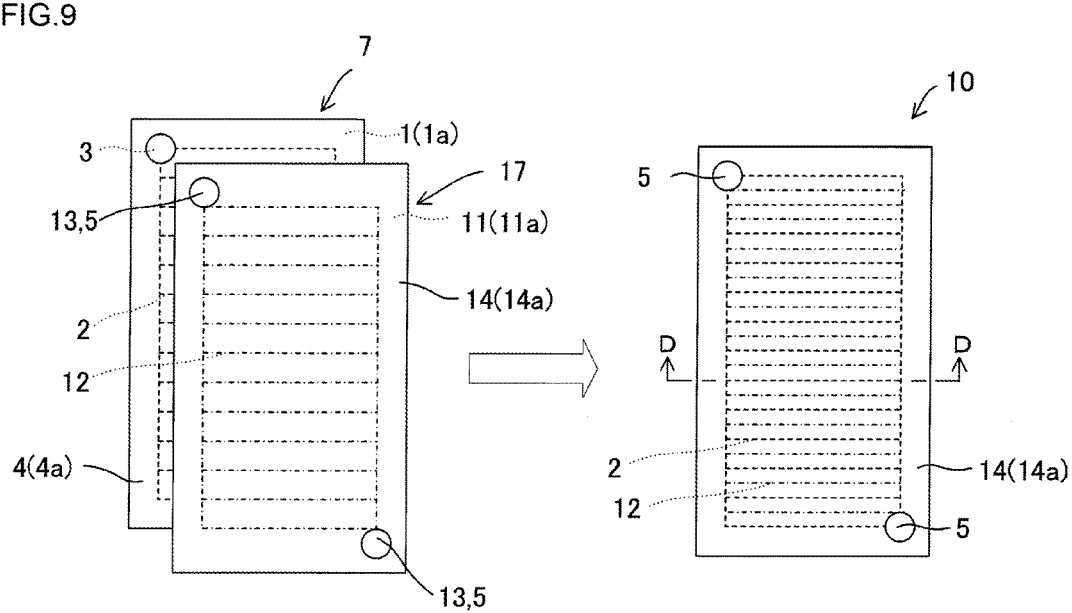
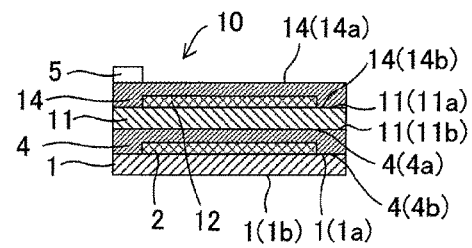

HEATER AND HONEYCOMB STRUCTURE INCLUDING HEATER

"The present application is an application based on JP-2016-063134 filed on Mar. 28, 2016 with Japan Patent Office, the entire contents of which are incorporated herein by reference."

BACKGROUND OF THE INVENTION

Field of the Invention

The present invention relates to a heater and a honeycomb structure including the heater.

Description of the Related Art

Regulations about the harmful materials, such as HC, CO, NOx, and PM exhausted from internal combustion engines, such as a gasoline engine and a diesel engine, have been reinforced on a global scale, but regulations about $CO_2$ emissions in addition to the above-mentioned emissions also have been reinforced for the current global warming issue and there is a demand on the improvement of fuel efficiency. For this reason, the improvement of the thermal efficiency of an engine has been examined to improve the fuel efficiency of an automotive gasoline engine and an automotive diesel engine.

In the past, exhaust gas has been purified using a honeycomb structure coated with a catalyst. However, since the temperature of exhaust gas of the engine is lowered when the thermal efficiency of the engine is improved, there is a problem in that the temperature of an exhaust gas purification catalyst becomes insufficient and purification capacity deteriorates. For this reason, an exhaust gas purification system having characteristics, in which a catalyst reaches an activating temperature immediately after the start of an engine and the catalyst having reached the activating temperature is hardly cooled and maintains catalytic activity even when low-temperature exhaust gas flows in, is required.

Accordingly, a system using an electrically heated catalyst (EHC) has been proposed in the past as an exhaust gas purification system that can perform uniform heating (for example, see Patent Document 1). This system is a system that includes electrodes provided on a honeycomb structure formed of a conductive ceramics and raises the temperature of a catalyst up to an activating temperature before the start of an engine by making the honeycomb structure generate heat by the flow of current.

Further, a heating device, in which electric heaters (resistance heating heaters) are disposed so as to surround the circumferential wall of a honeycomb structure and which transfers heat to a cell structure provided in the honeycomb structure by heating the surface of the circumferential wall of the honeycomb structure, also has been proposed as an exhaust gas purification device that can perform uniform heating (for example, see Patent Document 2).

[Patent Document 1] JP-A-2010-229976
[Patent Document 2] JP-A-2012-241548

Patent Document 2 has disclosed that an electrical heater (resistance heating heater) itself is replaced when an electrical heating wire embedded in a heat-insulation material is disconnected. However, since the honeycomb structure and a metal case provided around the electric heater are fixed to each other by welding or the like, it is not easy to replace the electric heater. Further, when disconnection occurs only in one electric heater among the plurality of electric heaters disposed so as to surround the outer wall of the honeycomb structure and the portion where disconnection occurs is not heated, large distribution in the heating of the honeycomb structure is generated. For this reason, there is a possibility that the breakage of the honeycomb structure, and the like may occur.

SUMMARY OF THE INVENTION

The invention has been made in consideration of the above-mentioned problems, and a member of the invention to provide a heater that can maintain required temperature even when the temperature of exhaust gas discharged from an engine is lowered and does not lose or does not deteriorate a function as a heater even when an electrical heating wire of the heater is disconnected, and a honeycomb structure including the heater.

In order to achieve the object, according to the invention, there is provided a heater including: a plate-like first heater substrate; an electrical heating wire that is provided on a first surface of the first heater substrate in a parallel circuit; electrodes that are connected to the electrical heating wire to allow current to flow in the electrical heating wire; and a plate-like cover substrate that covers the first surface of the first heater substrate, the electrical heating wire, and the electrodes with a second surface. Further, there is provided a heater that supplies the amount of heat when the electrical heating wire generates heat.

According to a first aspect of the present invention, a heater is provided including: a plate-like first heater substrate; an electrical heating wire that is provided on a first surface of the first heater substrate in a parallel circuit; electrodes that are connected to the electrical heating wire to allow current to flow in the electrical heating wire; and a plate-like cover substrate that covers the first surface of the first heater substrate, the electrical heating wire, and the electrodes with a second surface of the cover substrate, wherein the electrical heating wire generates heat, so that the amount of heat is supplied.

According to a second aspect of the present invention, the heater according to the first aspect is provided, wherein the first heater substrate and/or the cover substrate contain $Si_3N_4$ or $Al_2O_3$.

According to a third aspect of the present invention, the heater according to the first or second aspects is provided, wherein the electrical heating wire contains at least one kind of metal selected from a group consisting of WC, TiN, TaC, ZrN, $MoSi_2$, Pt, Ru, and W.

According to a fourth aspect of the present invention, the heater according to the third aspect is provided, wherein the first heater substrate and/or the cover substrate contain $Si_3N_4$, the electrical heating wire contains the metal and $Si_3N_4$, and the volume resistivity of the electrical heating wire is in the range of $4.0 \times 10^{-5}$ to $2.0 \times 10^{-4}$ $\Omega$cm.

According to a fifth aspect of the present invention, the heater according to the third or fourth aspects of the present invention are provided, wherein the first heater substrate and/or the cover substrate contain $Si_3N_4$, the electrical heating wire contains the metal and $Si_3N_4$, and the thermal expansion coefficient of the electrical heating wire is in the range of 3.1 to 7.1 ppm/K.

According to a sixth aspect of the present invention, the heater according to any of the first to fifth aspects is provided, wherein the first heater substrate, the electrical heating wire provided on the first heater substrate, and the electrodes form a first substrate set, one or more substrate sets each of which is the same as the first substrate set are stacked on the first substrate set, and the cover substrate is provided on the substrate sets, or the first heater substrate, the electrical heating wire provided on the first heater substrate, the electrodes, and the cover substrate form a first substrate set, and the first substrate sets are stacked.

According to a seventh aspect of the present specification, the heater according to the sixth aspect is provided, wherein a position of a parallel pattern of the parallel circuit of the electrical heating wire of the substrate set provided on the first substrate set corresponds to a position of a parallel pattern of an electrical heating wire provided on the first heater substrate when seen from a stacking direction.

According to an eighth aspect of the present invention, the heater according to the sixth aspect is provided, wherein positions of parallel patterns of the parallel circuits of the electrical heating wires of the respective substrate sets deviate from each other when seen from a stacking direction.

According to a ninth aspect of the present invention, the heater according to an eighth aspect is provided, wherein the parallel patterns of the parallel circuits of the electrical heating wires of the respective substrate sets deviate from each other by "(a pitch between rows of the parallel circuit)/(the number of stacked substrate sets)" when seen from the stacking direction.

According to a tenth aspect of the present invention, a honeycomb structure including the heater according to any of the first to ninth aspects is provided, the honeycomb structure including: a honeycomb structure that includes partition walls defining a plurality of cells forming a channel for fluid and extending from a first end face to a second end face; and at least one heater that is provided so as to surround an outer wall of the honeycomb structure.

According to an eleventh aspect of the present invention, the honeycomb structure according to the tenth aspect is provided, wherein a catalyst is loaded on the partition walls of the honeycomb structure.

Since the heater of the invention includes the electrical heating wire that is provided on the first surface of the first heater substrate in a parallel circuit, even when a part of the electrical heating wire is disconnected, other parts of the circuit allow current to flow. Accordingly, the function of the heater can be made not to be lost. Further, since the honeycomb structure of the invention includes the heater, even when a part of the electrical heating wire is disconnected, the honeycomb structure is heated by other parts of the circuit. Accordingly, large distribution in the heating of the honeycomb structure is not generated. For this reason, the breakage of the honeycomb structure can be prevented.

BRIEF DESCRIPTION OF THE DRAWINGS

FIG. 9 is a diagram showing another example of the stacked heater of the invention and showing an example of an aspect in which the positions of parallel patterns of parallel circuits of electrical heating wires deviate from each other when seen from a stacking direction;

DESCRIPTION OF THE PREFERRED EMBODIMENTS

An embodiment of the invention will be described below with reference to the drawings. The invention is not limited to the following embodiment, and may be modified, altered, and improved without departing from the scope of the invention.

(1) Heater

Figure 1:
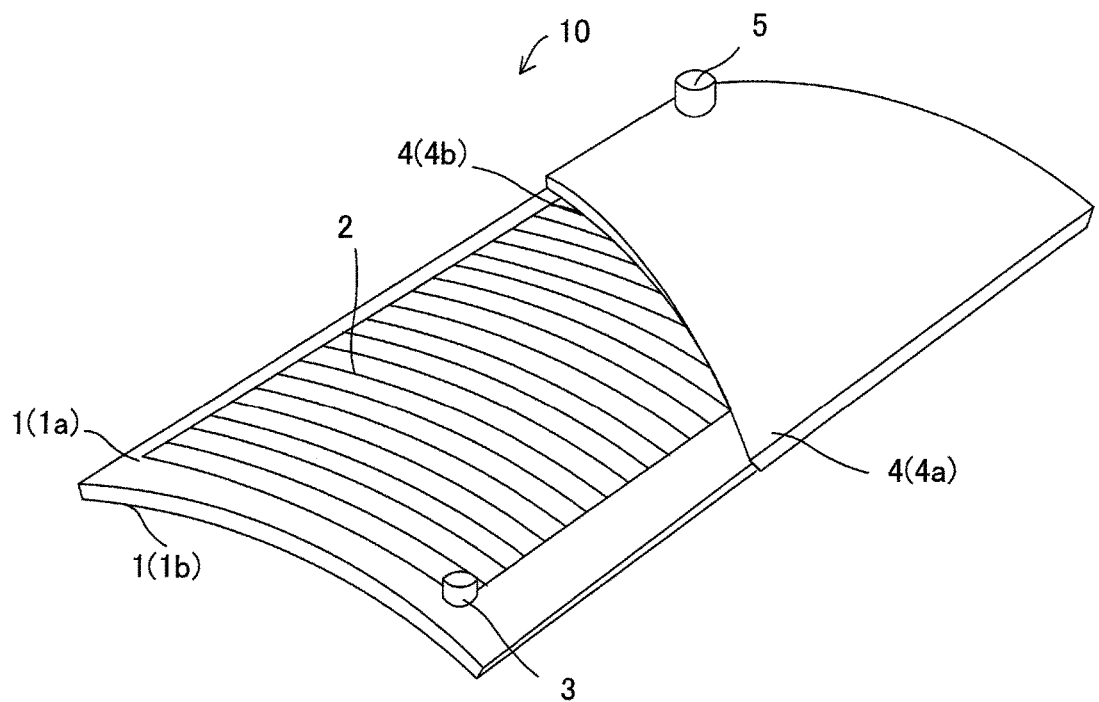
FIG. 1 is a diagram showing an example of a heater of the invention.
Figure 2:
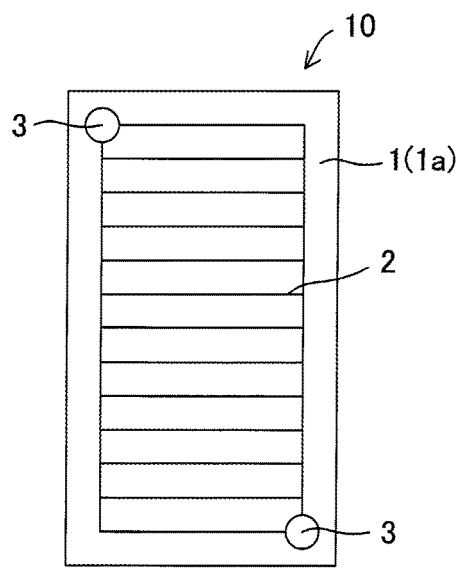
FIG. 2 is a diagram showing an example of circuits of an electrical heating wire of the heater of the invention.
Figure 3:
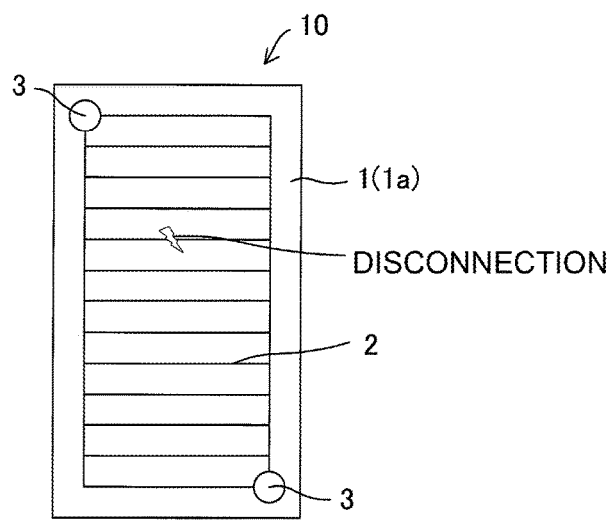
FIG. 3 is a diagram showing an example of an aspect in which a part of the circuits of FIG. 2 is disconnected.

As shown in FIGS. 1 to 3, an embodiment of a heater 10 of the invention includes: a plate-like first heater substrate 1; an electrical heating wire 2 that is provided on a first surface of the first heater substrate 1 in a parallel circuit; electrodes 3 that are connected to the electrical heating wire 2 so as to allow current to flow in the electrical heating wire 2; and a plate-like cover substrate 4 that covers a first surface 1a of the first heater substrate 1, the electrical heating wire 2, and the electrodes with a second surface 4b of the cover substrate. The electrical heating wire 2 of the heater 10 generates heat to supply the amount of heat. FIG. 1 is a diagram showing an embodiment of the heater 10 of the invention. FIG. 2 is a diagram showing an example of the circuits of the electrical heating wire 2 of the heater 10 of the invention. FIG. 3 is a diagram showing a case in which a part of the electrical heating wire 2 of FIG. 2 is disconnected.

A second surface 1b of the first heater substrate 1 is placed on a member to be heated, so that the heater 10 of the invention heats the member to be heated. Since the heater 10 of the invention includes the electrical heating wire 2 that is provided on the first surface 1a of the first heater substrate 1 in a parallel circuit, the other circuits allow current to flow even when a part of the electrical heating wire 2 is disconnected as shown in FIG. 3. Accordingly, the function of the heater is not lost.

Further, the heater 10 of the invention includes the first heater substrate 1, the electrical heating wire 2, the electrodes 3, and the cover substrate 4. The first heater substrate 1 has a plate shape, and includes the first surface 1a on which the electrical heating wire 2 is provided and the second surface 1b which is the back side of the first surface 1a and is installed on a member to be heated or another heater 10 (to be described below). It is preferable that the first heater substrate 1 has a shape along the shape of an outer wall 23 of a member to be heated on which the heater 10 is to be placed as shown in FIG. 1. Particularly, it is preferable that the second surface 1b of the first heater substrate 1 has a shape along the shape of the outer wall 23 of the member to be heated or another heater 10 on which the second surface is placed. Since at least the second surface 1b of the first heater substrate 1 has a shape along the outer wall 23 of a member to be heated or another heater 10, heat can be uniformly transferred.

The cover substrate 4 includes: a second surface 4b that covers the first surface 1a of the first heater substrate 1, the electrical heating wire 2, and the electrodes 3; and a first surface 4a that is a surface opposite to the second surface 4b. Meanwhile, the cover substrate 4 is a substrate that is provided on the uppermost surface of the heater 10 of FIG. 1, and it is preferable that the cover substrate 4 has substantially the same shape as the shape of the first heater substrate 1. Holes, through which the electrodes 3 are taken out, are formed in the cover substrate 4 and it is preferable that electrode rods 5 are formed in the holes. The electrode rods 5 are formed by a desired method, such as soldering. The surfaces of the heater 10 of the invention shown in FIG. 1 are formed of the second surface 1b and side surfaces of the first heater substrate 1, the first surface 4a and side surfaces of the cover substrate 4, and the electrode rods 5. The first heater substrate 1 and the cover substrate 4 are bonded to each other by gel cast, an adhesive, or a tape or pressure bonding.

Meanwhile, it is preferable that the first heater substrate 1 and/or the cover substrate 4 of the invention contain $Si_3N_4$ or $Al_2O_3$. It is preferable that the first heater substrate 1 and/or the cover substrate 4 of the invention contain, for example, $Si_3N_4$ or $Al_2O_3$, whose volume resistivity at an operating temperature is $10^{14}$ Ω·cm, as a main component and contain a sintering additive and the like as accessory components.

Particularly, it is preferable that the first heater substrate 1 and the cover substrate 4 contain a silicon nitride ($Si_3N_4$) as a main component. The thermal expansion coefficient of a silicon nitride is 3.5 ppm/K and is smaller than 7.2 ppm/K that is the thermal expansion coefficient of alumina. Further, the strength of a silicon nitride is 790 MPa and is higher than 590 MPa that is the strength of alumina. For this reason, since a silicon nitride has a thermal shock resistance against a rapid temperature change, a silicon nitride is suitable for the substrate of a heater.

Furthermore, the heater 10 of the invention includes the electrical heating wire 2 that is provided on the first surface 1a of the first heater substrate 1 in a parallel circuit as shown in FIG. 2. Since the electrical heating wire 2 is disposed in the parallel circuit, a function as the heater 10 is not lost or does not deteriorate even when the electrical heating wire 2 of the heater 10 is disconnected. Specifically, rows of the other circuits are branched, thus even when the electrical heating wire 2 is disconnected at a certain row of the circuit as shown in FIG. 3, for example, current can flow. For this reason, even when the electrical heating wire 2 is disconnected at a certain circuit and heating cannot be performed by the disconnected circuit, heating can be performed by the other portions of the electrical heating wire 2 of the heater 10. Accordingly, a function as the heater 10 is maintained.

Further, since current does not flow in a row at which the electrical heating wire 2 is disconnected, temperature becomes low and the distribution of heat in the heater 10 can be less at the row. However, since heating is performed by the circuits of adjacent rows, the distribution of heat can be kept to the minimum. Meanwhile, the intervals of the rows of the parallel circuit may or may not be uniform. When the intervals of the rows are uniformly arranged, a member to be heated can be uniformly heated. When the intervals of the rows are not uniformly arranged, it is preferable that the intervals are appropriately changed to correspond to the desired degree of heating for each portion of the member to be heated.

It is preferable that the electrical heating wire 2 contains at least one kind of metal selected from a group consisting of WC, TiN, TaC, ZrN, $MoSi_2$, Pt, Ru, and W. The electrical heating wire 2 is formed in an arbitrary shape, such as a linear shape, on the first surface 1a of the first heater substrate 1, and is disposed in the form of parallel circuit. Further, it is preferable that the diameter of the electrical heating wire 2 is in the range of 0.005 to 0.020 $mm^2$.

Figure 4:
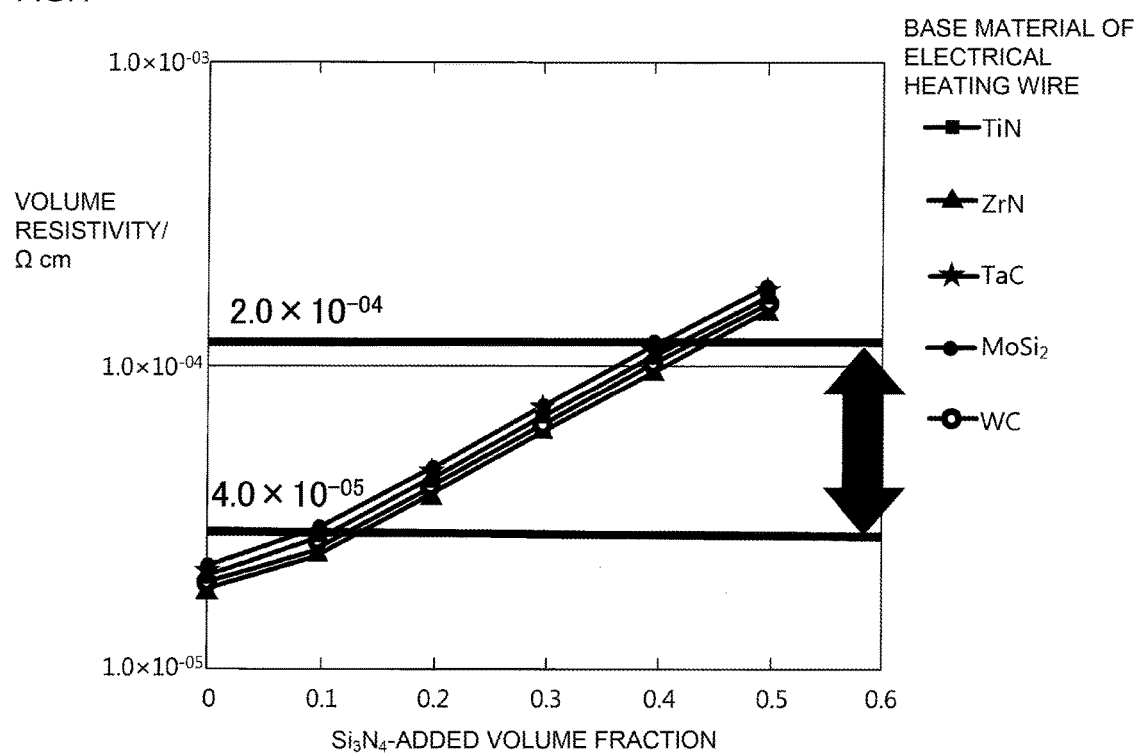
FIG. 4 is a graph showing the volume resistivity of the electrical heating wire.

FIG. 4 shows a graph showing the volume resistivity of the electrical heating wire 2. When $Si_3N_4$ is added to metal serving as the base material of the electrical heating wire 2, the volume resistivity of the electrical heating wire 2 is increased. When the heater substrate contains $Si_3N_4$, it is preferable that the electrical heating wire 2 contains metal and $Si_3N_4$ and the volume resistivity of the electrical heating wire 2 is in the range of $4.0 \times 10^{-5}$ to $2.0 \times 10^{-4}$ Ωcm. Further, it is preferable that the volume resistivity of the electrical heating wire 2 is appropriately adjusted by the addition of $Si_3N_4$ according to the diameter of the electrical heating wire 2.

Figure 5:
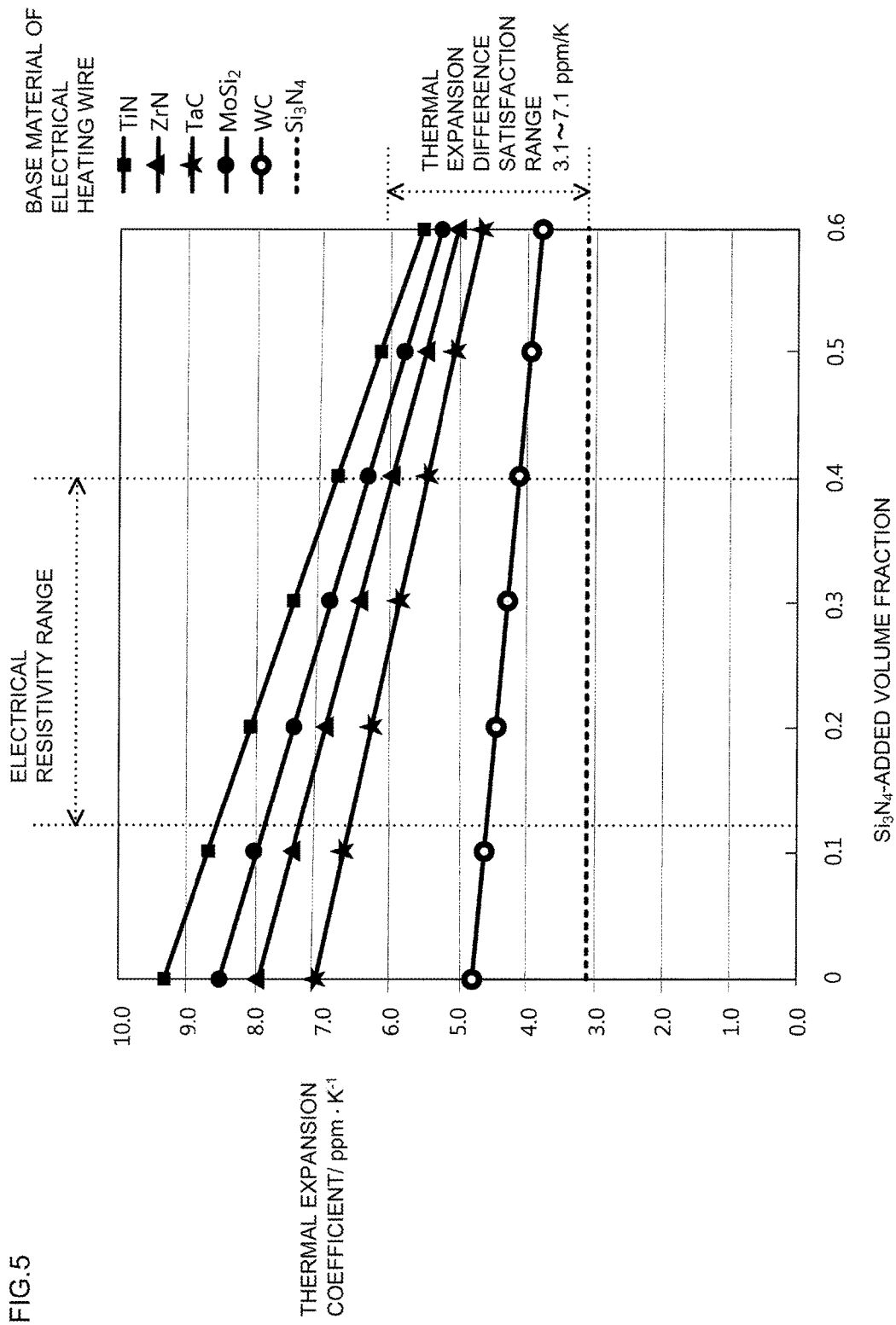
FIG. 5 is a graph showing the thermal expansion coefficient of the electrical heating wire.

Furthermore, FIG. 5 shows a graph showing the thermal expansion coefficient of the electrical heating wire 2. When $Si_3N_4$ is added to metal serving as the base material of the electrical heating wire 2, the thermal expansion coefficient of the electrical heating wire 2 is reduced. When the heater substrate contains $Si_3N_4$, it is preferable that the electrical heating wire 2 contains metal and $Si_3N_4$ and the thermal expansion coefficient of the electrical heating wire 2 is in the range of 3.1 to 7.1 ppm/K. It is more preferable that the thermal expansion coefficient of the electrical heating wire 2 is in the range of 3.1 to 5.1 ppm/K. Since a difference between the thermal expansion coefficient of the heater substrate and the thermal expansion coefficient of the electrical heating wire 2 is reduced when the thermal expansion coefficient of the electrical heating wire 2 is adjusted to the range of 3.1 to 7.1 ppm/K by the addition of $Si_3N_4$, the breakage of the heater 10 caused by the thermal expansion of the electrical heating wire 2 can be prevented. For example, the separation of the first heater substrate 1 and the cover substrate 4, which are disposed beneath and on the electrical heating wire 2, can be prevented.

When the volume resistivity and the thermal expansion coefficient of the electrical heating wire 2 are adjusted in this way, the disconnection of the electrical heating wire 2 and the breakage of the heater 10 can be prevented.

The electrodes 3 are connected to the electrical heating wire 2 to allow current to flow in the electrical heating wire 2. The positions of the electrodes are not limited to positions that are present on the diagonal of the parallel circuit as shown in FIG. 2, and can be disposed at desired positions. Further, examples of the material of the electrode 3 can include Ni, Mo, W, and stainless steel (SUS), and it is preferable that the electrodes 3 are bonded to the first heater substrate 1 by brazing, welding, or the like.

Next, a heater 10 including a plurality of electrical heating wires 2 will be described. FIGS. 6 to 9 show examples of a heater 10 in which a plurality of substrate sets of the invention are stacked. It is preferable that the first heater substrate 1, the electrical heating wire 2 provided on the first heater substrate 1, and the electrodes 3 form a first substrate set 7, one or more substrate sets each of which is the same as the first substrate set 7 are stacked on the first substrate set 7, and the cover substrate 4 is provided on the substrate sets in the heater 10 of the invention. Alternatively, it is preferable that the first heater substrate 1, the electrical heating wire 2 provided on the first heater substrate 1, the electrodes 3, and the cover substrate 4 form a first substrate set 7, and the first substrate set 7 is stacked in the heater 10 of the invention. Meanwhile, in FIGS. 6 to 9, a broken line is the electrical heating wire 2 provided on the first heater substrate 1 and shows the electrical heating wire 2 in a case in which a second heater substrate 11, the cover substrate 4, and the like are stacked thereon. Further, a one-dot chain line is an electrical heating wire 12 provided on the second heater substrate 11, and shows an electrical heating wire 12 in a case in which cover substrates 4 and 14 are stacked thereon. Furthermore, since the parallel patterns of two electrical heating wires are stacked at the same position, the broken line and the one-dot chain line should be drawn to overlap each other in diagrams on the right side in FIGS. 6 and 8. However, only the broken line is drawn in diagrams on the right side in FIGS. 6 and 8 for the emphasis on visibility. For the same reason, only the broken line is also drawn at connection circuit portions that connect the parallel patterns of FIGS. 6 to 9.

Figure 6:
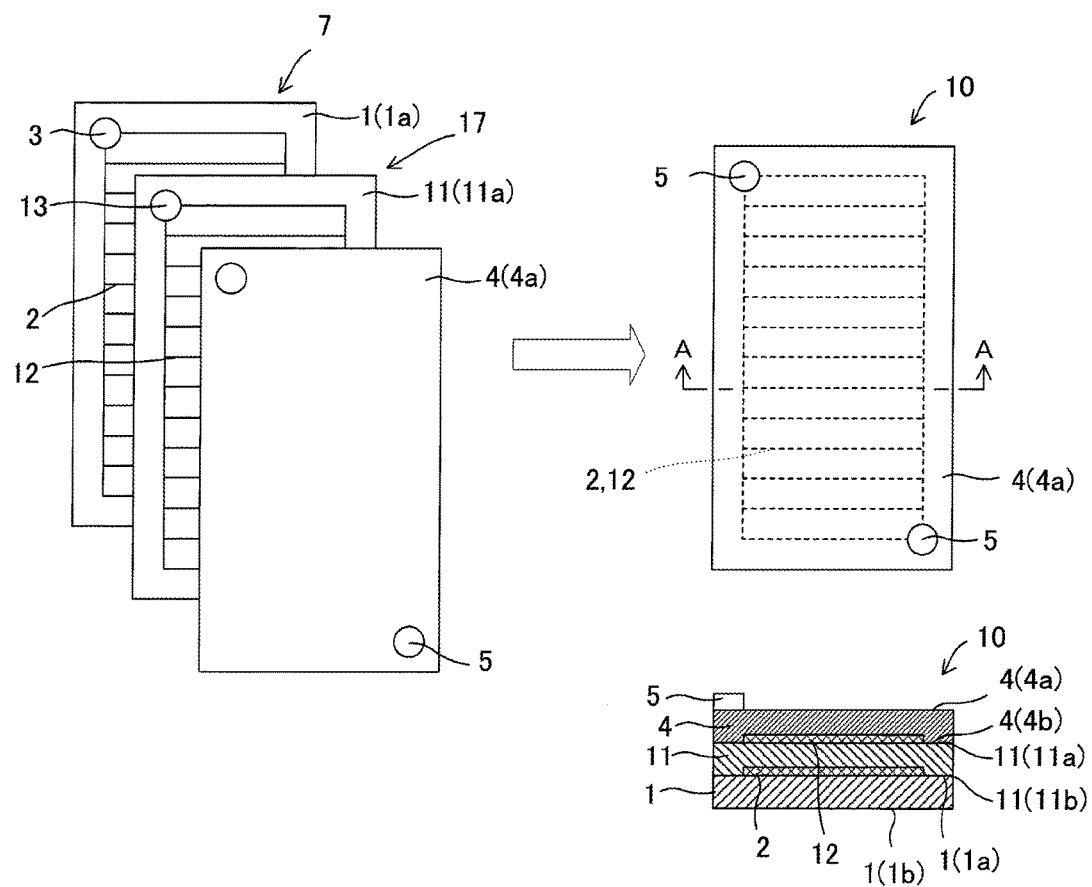
FIG. 6 is a diagram showing an example of a stacked heater of the invention and showing an example of an aspect in which the positions of parallel patterns of parallel circuits of electrical heating wires correspond to each other when seen from a stacking direction.
Figure 7:
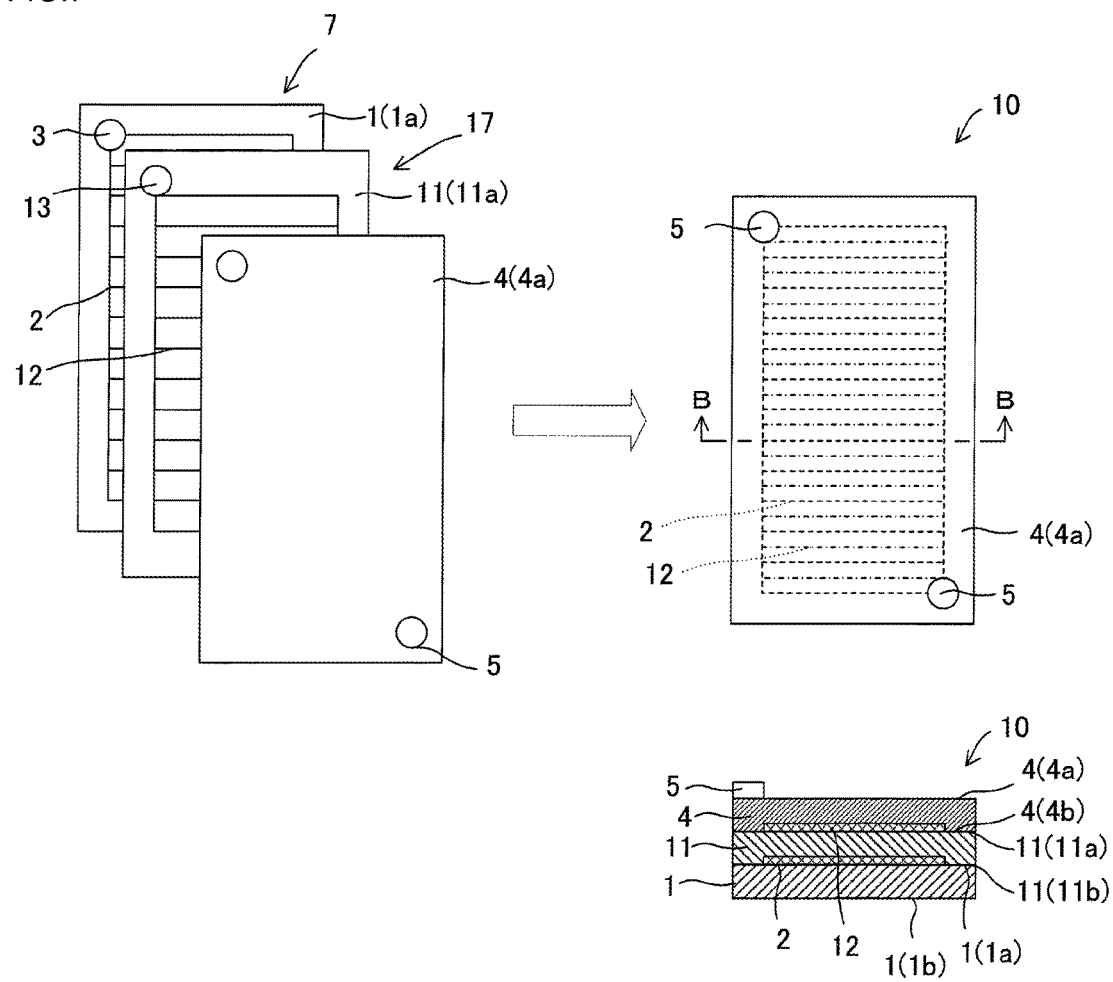
FIG. 7 is a diagram showing an example of the stacked heater of the invention and showing an example of an aspect in which the positions of parallel patterns of parallel circuits of electrical heating wires deviate from each other when seen from a stacking direction.

FIGS. 6 and 7 show examples of the heater 10 in which the first heater substrate 1, the electrical heating wire 2 provided on the first heater substrate 1, and the electrodes 3 form a first substrate set 7, one or more substrate sets each of which is the same as the first substrate set 7 are stacked on the first substrate set 7, and the cover substrate 4 is provided on the substrate sets. The number of substrate sets to be stacked is not particularly limited, but an example in which one substrate set is stacked on the first substrate set 7 in the following description will be described. Here, the substrate set provided on the first substrate set 7 is referred to as a second substrate set 17, and a heater substrate included in the second substrate set 17 is referred to as a second heater substrate 11.

It is preferable that the two substrate sets are stacked so that the first surface 1a of the first heater substrate 1, the electrical heating wire 2, and the electrodes 3 included in the first substrate set 7 are covered with a second surface 11b of a plate-like second heater substrate 11 included in a second substrate set 17. The second surface 11b of the second heater substrate 11 is in contact with the first surface 1a of the first heater substrate 1, the electrical heating wire 2, and the electrodes 3; and the second substrate set 17 includes an electrical heating wire 12 that is arranged on a first surface 11a of the second heater substrate 11 in a parallel circuit, and electrodes 13 that allow current to flow in the electrical heating wire 12. Further, it is preferable that the cover substrate 4 is disposed to cover the first surface 11a of the second heater substrate 11, the electrical heating wire 12, and the electrodes 13 with the second surface 4b thereof. Meanwhile, it is preferable to stack substrates of the heater 10 by preparing paste of the same material as the heater substrate or paste of glass, applying it between the respective substrates, and firing. The heater 10 includes the second heater substrate 11 having the electrical heating wire 12 arranged in a parallel circuit. Accordingly, even when a part of the electrical heating wire 2 provided on the first heater substrate 1 is disconnected, a portion where the electrical heating wire 2 is disconnected can be heated by the electrical heating wire 12 provided on the second heater substrate 11.

The embodiment including the second heater substrate 11 includes the second heater substrate 11, which is provided with the electrical heating wire 12 and the electrode 13, between the plate-like first heater substrate 1, which is provided with the electrical heating wire 2 and the electrodes 3, and the cover substrate 4. Specifically, first, the embodiment includes the plate-like first heater substrate 1, the electrical heating wire 2 that is provided on the first surface 1a of the first heater substrate 1 in a parallel circuit, and the electrodes 3 that allow current to flow in the electrical heating wire 2. The second surface 11b of the plate-like second heater substrate 11 is provided on the first surface 1a of the first heater substrate 1, the electrical heating wire 2, and the electrodes 3. It is preferable that the second surface 1b of the second heater substrate 11 has a shape along the first surface 1a of the first heater substrate 1 with the electrical heating wire 2 and the electrodes 3 interposed between the second surface 11b and the first surface 1a. Further, the electrical heating wire 12, which forms the parallel circuit, and the electrodes 13 are provided on the first surface 11a of the second heater substrate 11. Meanwhile, it is preferable that positions at which the electrodes 13 are provided are the same as the positions of the electrodes 3 of the first heater substrate 1. In addition, the cover substrate 4 is disposed so as to cover the first surface 11a of the second heater substrate 11, the electrical heating wire 12, and the electrodes 13. It is preferable that the second surface 4b of the cover substrate 4 has a shape along the first surface 11a of the second heater substrate 11 with the electrical heating wire 12 and the electrodes 13 interposed between the second surface 4b and the first surface 11a.

The parallel pattern position of the parallel circuit of the electrical heating wire 12, which is provided on the second heater substrate 11, may correspond to or may be different from the parallel pattern position of the parallel circuit of the electrical heating wire 2, which is provided on the first heater substrate 1, when seen from a stacking direction. Even though the parallel pattern positions of the electrical heating wires 2 and 12 correspond to each other or are different from each other, the row of the circuit including a disconnected portion can be heated when the electrical heating wire 2 of the first heater substrate 1 is disconnected.

FIG. 6 shows an example of an aspect in which the parallel pattern position of the parallel circuit of the electrical heating wire 12 provided on the second heater substrate 11 is disposed to correspond to the parallel pattern position of the electrical heating wire 2 provided on the first heater substrate 1 when seen from a stacking direction. A diagram on the right side in FIG. 6 shows a state in which the first substrate set 7, the second substrate set 17, and the cover substrate 4 are stacked when seen from the first surface 4a of the cover substrate 4 (from the stacking direction). Meanwhile, a lower right diagram in FIG. 6 is a cross-sectional view of the heater 10 taken along line A-A.

An embodiment in which the parallel pattern position of the parallel circuit of the electrical heating wire 12 of the second substrate set 17 provided on the first substrate set 7 corresponds to the parallel pattern position of the electrical heating wire 2 provided on the first heater substrate 1 when seen from the stacking direction is preferable in terms of uniformly heating a member to be heated on which the heater 10 is provided. The fact that the positions of the parallel patterns of the parallel circuit of the electrical heating wires 2 and 12 correspond to each other when seen from the stacking direction means that the electrical heating wire 12 provided on the second heater substrate 11 has the same arrangement of the circuit as the arrangement of the circuit of the electrical heating wire 2 provided on the first heater substrate 1 and the substrate sets are stacked so that the positions of the circuits of the electrical heating wires 2 and 12 correspond to each other. If the positions of the parallel patterns of the parallel circuits of the electrical heating wires 2 and 12 correspond to each other when seen from the stacking direction, in a case in which a part of the electrical heating wire 2 provided on the first heater substrate 1 is disconnected and a row on which a disconnected portion is present is not heated, the row on which the disconnected portion is present can be heated by the electrical heating wire 12 since the electrical heating wire 12 is provided on the same row on the second heater substrate 11 as the row on which the disconnected portion is present. In this way, a variation in the distribution of temperature of the heater 10 at the time of occurrence of disconnection can be alleviated.

FIG. 7 shows an example of an aspect in which the parallel pattern position of the parallel circuit of the electrical heating wire 2 provided on the first heater substrate 1 and the parallel pattern position of the parallel circuit of the electrical heating wire 12 provided on the second heater substrate 11 are disposed so as to deviate from each other when seen from a stacking direction. A diagram on the right side in FIG. 7 shows a state in which the first substrate set 7, the second substrate set 17, and the cover substrate 4 are stacked when seen from the first surface 4a of the cover substrate 4 (from the stacking direction). A lower right diagram in FIG. 7 is a cross-sectional view of the heater 10 taken along line B-B. Meanwhile, "deviate from each other when seen from a stacking direction" means that the parallel portions of the parallel circuits of the electrical heating wires of the respective substrate sets deviate from each other in a thickness direction.

An embodiment in which the the parallel pattern positions of the parallel circuit of the electrical heating wires of the respective substrate sets deviate from each other when seen from the stacking direction is also preferable in terms of uniformly heating a member to be heated on which the heater 10 is provided. When the first substrate set 7 and the second substrate set 17 are stacked, the fact that the positions of the parallel patterns of the parallel circuits of the electrical heating wires 2 and 12 included in the respective first and second substrate sets 7 and 17 deviate from each other when seen from the stacking direction means that the first substrate set 7 and the second substrate set 17 are stacked so that the electrical heating wire 12 provided on the second heater substrate 11 has a different pattern of parallel circuit from that of the parallel circuit of the electrical heating wire 2 provided on the first heater substrate 1 and at least a part of the electrical heating wire 12 provided on the second heater substrate 11 is disposed at a position where the electrical heating wire 2 of the first heater substrate 1 is not provided. Meanwhile, it is preferable that the pitches between rows of the parallel circuits of the respective electrical heating wires in the two substrate sets are equal to each other. If the parallel pattern position of the parallel circuit of the electrical heating wire 2 provided on the first heater substrate 1 and the parallel pattern position of the electrical heating wire 12 provided on the second heater substrate 11 deviate from each other when seen from the stacking direction, in a case in which a part of the electrical heating wire 2 provided on the first heater substrate 1 is disconnected and a row on which a disconnected portion is present is not heated, a portion which is disconnected and in which current does not flow is also heated by the electrical heating wire 12 that is disposed on the second heater substrate 11 and is provided at a position between the rows of the electrical heating wire 2 adjacent to the disconnected electrical heating wire 2 provided on the first heater substrate 1. In this way, a variation in the distribution of temperature of the heater 10 at the time of occurrence of disconnection can be alleviated. Meanwhile, a variation in the distribution of temperature of the heater 10 can be further alleviated in the heater 10 of this embodiment compared to the heater 10 in which the heater substrates are stacked so that the parallel pattern positions of the above-mentioned parallel circuits correspond to each other when seen from the stacking direction.

Further, in an embodiment in which the parallel pattern position of the parallel circuit of the electrical heating wire 2 of the first substrate set 7 and the parallel pattern position of the parallel circuit of the electrical heating wire 12 of the second substrate set 17 deviate from each other when seen from the stacking direction as shown in FIG. 7, it is preferable that the substrate sets are stacked so that the parallel patterns of the parallel circuit of the electrical heating wire 2 provided on the first heater substrate 1 and the parallel patterns of the parallel circuit of the electrical heating wire 12 provided on the second heater substrate 11 deviate from each other and are alternately disposed. Specifically, it is preferable that the parallel patterns of the parallel circuits of the electrical heating wires of the respective substrate sets deviate from each other by "(a pitch between rows of the parallel circuit)/2" when seen from the stacking direction. In this case, when a part of the electrical heating wire 2 or 12 provided on one of the first heater substrate 1 and the second heater substrate 11 is disconnected and a row of the circuit including a disconnected portion does not allow current to flow and does not generate heat, a member to be heated can be uniformly heated by the generation of heat from the electrical heating wire 12 or 2 of the other heater substrate. Specifically, the electrical heating wire 12 or 2 provided on the heater substrate including the electrical heating wire 12 or 2, which is not disconnected, is positioned closer to a disconnected row than the electrical heating wire 2 or 12 of a row adjacent to the disconnected row provided on the heater substrate including the disconnected electrical heating wire 2 or 12. For this reason, a portion, which includes the disconnected electrical heating wire 2 or 12, is also heated by the generation of heat from the electrical heating wire 12 or 2 that is positioned close to the disconnected row. Since the heater 10 including the heater substrates, which are stacked so that the parallel patterns deviate from each other and are alternately disposed when seen from the stacking direction in this way, uniformly generates heat, the heater 10 can uniformly heat a member to be heated.

An example of the heater 10 including the first and second heater substrates 1 and 11 has been described. However, the invention is not limited to the heater including two heater substrates, and a heater 10 including two or more heater substrates including a third heater substrate or a fourth heater substrate is also preferable. Further, the cover substrate 4 is provided on a first surface of the uppermost heater substrate. When a heater includes two or more heater substrates, all the positions of the parallel patterns of electrical heating wires may correspond to each other or may be different from each other when seen from the stacking direction. Furthermore, when a heater includes three heater substrates, the parallel pattern position of the electrical heating wire 2 provided on the first heater substrate 1 and the parallel pattern position of the electrical heating wire provided on the third heater substrate may correspond to each other and may be different from the parallel pattern position of the electrical heating wire 12 provided on the second heater substrate 11.

When the substrate sets are stacked so that all the positions of the parallel patterns of the electrical heating wires 2 are different from each other when seen from the stacking direction, it is preferable that the parallel patterns of the parallel circuits of the electrical heating wires of the respective substrate sets deviate from each other by "(a pitch between rows of the parallel circuit)/(the number of stacked substrate sets)" when seen from the stacking direction. In this case, it is preferable that all the pitches between rows of the parallel circuits of the respective electrical heating wires included in the plurality of substrate sets are equal to each other. When the parallel patterns deviate from each other by "(a pitch between rows of the parallel circuit)/(the number of stacked substrate sets)", all the electrical heating wires provided on the stacked heater substrates are disposed so that a distance between the closest electrical heating wires is constantly positioned. Accordingly, even when the electrical heating wire is disconnected at any row, accurate compensation can be performed by the generation of heat from the electrical heating wire positioned closest to the disconnected row. For this reason, a variation in the distribution of heat can be prevented. Therefore, a member to be heated on which the heater 10 is provided can be uniformly heated.

Figure 8:
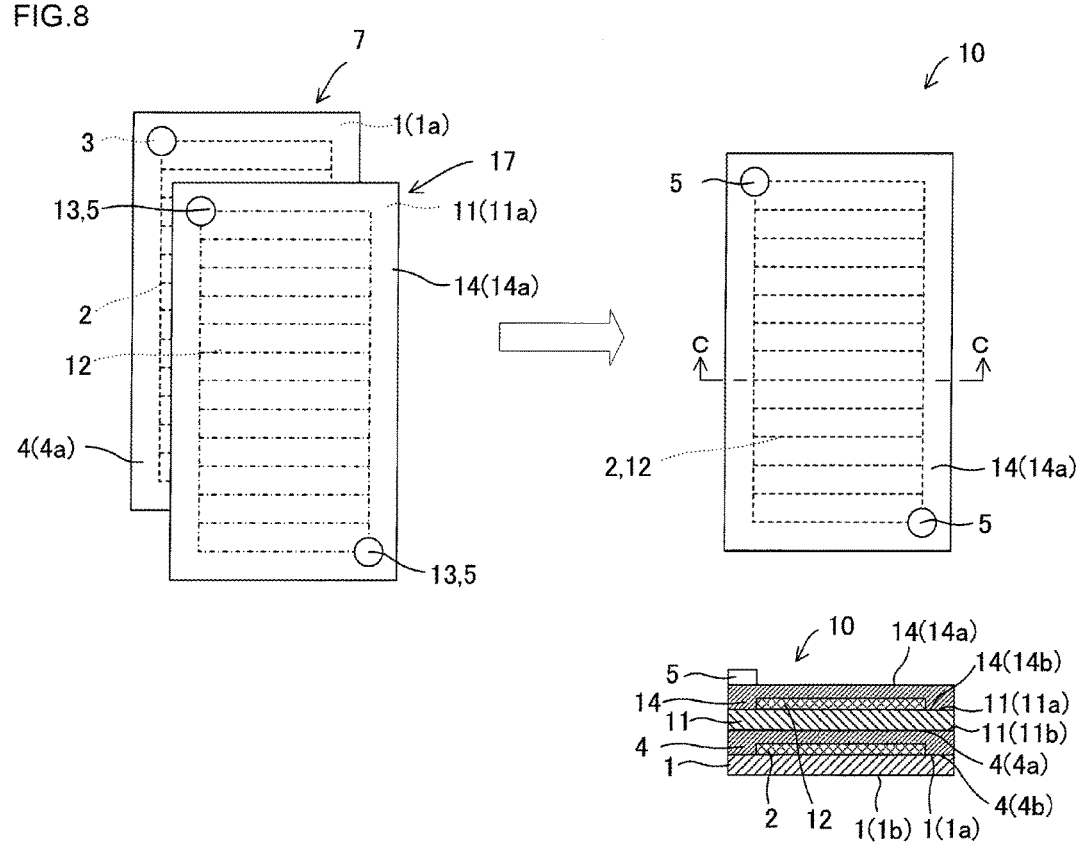
FIG. 8 is a diagram showing another example of the stacked heater of the invention and showing an example of an aspect in which the positions of parallel patterns of parallel circuits of electrical heating wires correspond to each other when seen from a stacking direction.

Next, the heater in which substrate sets including the cover substrate 4 are stacked will be described. FIGS. 8 and 9 show examples of the heater 10 in which the first heater substrate 1, the electrical heating wire 2 provided on the first heater substrate 1, the electrodes 3, and the cover substrate 4 form a first substrate set 7 and the substrate sets are stacked. The number of stacked substrate sets is not particularly limited, but an example in which one substrate set is stacked on the first substrate set 7 will be described below. Here, the substrate set provided on the first substrate set 7 is referred to as a second substrate set 17, and a heater substrate included in the second substrate set 17 is referred to as a second heater substrate 11.

It is preferable that the two substrate sets are stacked so that the cover substrate 4 included in the first substrate set 7 is covered with a second surface 11b of the plate-like second heater substrate 11 included in the second substrate set 17. Each of the substrate sets includes: a plate-like heater substrate; an electrical heating wire that is provided on the first surface of the heater substrate in a parallel circuit; electrodes that allow current to flow in the electrical heating wire; and a plate-like cover substrate that covers the first surface of the heater substrate, the electrical heating wire, and the electrodes with a second surface thereof since the electrical heating wire 2 included in each substrate set is covered with the cover substrate 4, the electrical heating wires are shown by a broken line and a one-dot chain line, respectively. Meanwhile, a substrate set, which includes a plurality of heater substrates each of which is provided with an electrical heating wire and electrodes, can also be used as the substrate set to be stacked. As a method of stacking substrate sets, it is preferable to stack (bond) the substrates by preparing paste of the same material as the heater substrate or paste of glass, applying it between the respective substrates, and firing. Further, it is preferable that the positions of the electrodes 3 to be stacked, which are included in the heater 10, are present at the same position. Since the heater 10 includes the second substrate set 17 that includes the electrical heating wire 12 arranged in a parallel circuit, a disconnected portion can be heated by the electrical heating wire 12 provided on the second heater substrate 11 even when a part of the electrical heating wire 2 provided on the first heater substrate 1 is disconnected.

When seen from the stacking direction, the parallel pattern position of the parallel circuit of the electrical heating wire 12 provided on the second heater substrate 11 included in the second substrate set 17 may correspond to or may be different from the parallel pattern position of the parallel circuit of the electrical heating wire 2 provided on the first heater substrate 1 included in the first substrate set 7. Whether the positions of the parallel patterns of the electrical heating wires 2 and 12 correspond or deviate each other, the row of the circuit including a disconnected portion can be heated when the electrical heating wire 2 of the first substrate set 7 is disconnected.

FIG. 8 shows an example of an aspect in which the parallel pattern position of the parallel circuit of the electrical heating wire 12 provided on the second heater substrate 11 of the second substrate set 17 provided on the first substrate set 7 correspond to the parallel pattern of the electrical heating wire 2 provided on the first heater substrate 1 of the first substrate set 7 when seen from the stacking direction. A diagram on the right side in FIG. 8 shows a state in which the first substrate set 7 and the second substrate set 17 are stacked when seen from a first surface 14a of the cover substrate 14 of the second substrate set 17 (from the stacking direction). Meanwhile, a first surface 11a of the second heater substrate 11 is covered with a second surface 14b of the cover substrate 14 that is opposite to the first surface 14a. Further, a lower right diagram in FIG. 8 is a cross-sectional view of the heater 10 taken along line C-C.

An embodiment in which the parallel pattern position of the parallel circuit of the electrical heating wire 12 of the substrate set 17 provided on the first substrate set 7 correspond to the parallel pattern position of the electrical heating wire 2 provided on the first heater substrate 1 when seen from the stacking direction is preferable in terms of uniformly heating a member to be heated on which the heater 10 is provided. The fact that the positions of the parallel patterns of the parallel circuits of the electrical heating wires 2 and 12 correspond to each other when seen from the stacking direction means that the electrical heating wire 12 provided on the second heater substrate 11 of the second substrate set 17 has the same arrangement of the circuits as the arrangement of the circuits of the electrical heating wire 2 provided on the first heater substrate 1 of the first substrate set 7 and the substrate sets are stacked so that the positions of the circuits of the electrical heating wires 2 and 12 correspond to each other. If the positions of the parallel patterns of the parallel circuits of the electrical heating wires 2 and 12 correspond to each other when seen from the stacking direction, in a case in which a part of the electrical heating wire 2 included in the first substrate set 7 is disconnected and a row on which a disconnected portion is present is not heated, the row including the disconnected portion can be heated by the electrical heating wire 12 since the electrical heating wire 12 is provided on the same row on the second heater substrate 11 of the second substrate set 17 as the row on which the disconnected portion is present. In this way, a variation in the distribution of temperature of the stacked heater 10 at the time of occurrence of disconnection can be alleviated.

FIG. 9 shows an example of an aspect in which the parallel pattern position of the parallel circuits of the electrical heating wire 2 provided on the first heater substrate 1 included in the first substrate set 7 and the parallel pattern position of the parallel circuits of the electrical heating wire 12 provided on the second heater substrate 11 included in the second substrate set 17 are disposed so as to deviate from each other when seen from the stacking direction. A diagram on the right side in FIG. 9 shows a state in which the first substrate set 7 and the second substrate set 17 are stacked when seen from the first surface 14a of the cover substrate 14 of the second substrate set 17 (from the stacking direction). Meanwhile, a first surface 11a of the second heater substrate 11 is covered with the second surface 14b of the cover substrate 14 that is opposite to the first surface 14a. Further, a lower right diagram in FIG. 9 is a cross-sectional view of the heater 10 taken along line D-D. Meanwhile, although described above, "deviate from each other when seen from the stacking direction" means that the parallel portions of the parallel circuits of the electrical heating wires of the respective substrate sets deviate from each other in a thickness direction.

An embodiment in which the positions of the parallel patterns of the parallel circuits of the electrical heating wires of the respective substrate sets deviate from each other when seen from the stacking direction is also preferable in terms of uniformly heating a member to be heated on which the heater 10 is provided. When the first substrate set 7 and the second substrate set 17 are stacked, the fact that the positions of the parallel patterns of the parallel circuits of the electrical heating wires 2 and 12 included in the respective first and second substrate sets 7 and 17 deviate from each other when seen from the stacking direction means that the first substrate set 7 and the second substrate set 17 are stacked so that the electrical heating wire 12 provided on the second heater substrate 11 has parallel circuit position different from the parallel circuit position of the electrical heating wire 2 provided on the first heater substrate 1 and at least a part of the electrical heating wire 12 provided on the second heater substrate 11 is disposed at a position where the electrical heating wire 2 of the first heater substrate 1 is not provided. Meanwhile, it is preferable that the pitches between rows of the parallel circuits of the respective electrical heating wires included in two substrate sets are equal to each other. If the parallel pattern position of the parallel circuits of the electrical heating wire 2 included in the first substrate set 7 and the parallel pattern position of the electrical heating wire 12 included in the second substrate set 17 deviate from each other when seen from the stacking direction, in a case in which a part of the electrical heating wire 2 included in the first substrate set 7 is disconnected and a row on which a disconnected portion is present is not heated, a portion which is disconnected and in which current does not flow is also heated by the electrical heating wire 12 that is included in the second substrate set 17 and is provided at a position between the rows of the electrical heating wire 2 adjacent to the disconnected electrical heating wire 2. In this way, a variation in the distribution of temperature of the heater 10 at the time of occurrence of disconnection can be alleviated. Meanwhile, a variation in the distribution of temperature of the heater 10 can be further alleviated in the heater 10 of this embodiment than in the heater 10 in which the substrate sets are stacked so that the positions of the parallel patterns of the above-mentioned parallel circuits correspond to each other when seen from the stacking direction.

Further, in an embodiment in which the parallel pattern position of the parallel circuit of the electrical heating wire 2 of the first substrate set 7 and the parallel pattern position of the parallel circuit of the electrical heating wire 12 of the second substrate set 17 deviate from each other when seen from the stacking direction as shown in FIG. 9, it is preferable that the substrate sets are stacked so that the parallel pattern of the parallel circuit of the electrical heating wire 2 included in the first substrate set 7 and the parallel pattern of the parallel circuit of the electrical heating wire 12 included in the second substrate set 17 deviate from each other and are alternately disposed. Specifically, it is preferable that the parallel patterns of the parallel circuits of the electrical heating wires of the respective substrate sets deviate from each other by "(a pitch between rows of the parallel circuit)/2" when seen from the stacking direction. In this case, when a part of the electrical heating wire 2 or 12 included in one of the first substrate set 7 and the second substrate set 17 is disconnected and a row of the circuit including a disconnected portion does not allow current to flow and does not generate heat, a member to be heated can be uniformly heated by the generation of heat from the electrical heating wire 12 or 2 included in the other substrate set. Specifically, the electrical heating wire 12 or 2 included in the substrate set including the other electrical heating wire, which is not disconnected, of the electrical heating wires 12 and 2 is positioned closer to a disconnected row than the electrical heating wire 2 or 12 of a row adjacent to the disconnected row included in the substrate set including the disconnected electrical heating wire of the electrical heating wires 2 and 12; and a disconnected portion can be heated by the two electrical heating wires 12 and 2. Since the heater 10, in which the substrate sets are stacked so that the parallel patterns deviate from each other and are alternately disposed when seen from the stacking direction in this way, uniformly generates heat, the heater 10 can uniformly heat a member to be heated.

Meanwhile, an example in which two substrate sets are stacked has been described in FIG. 9. However, the invention is not limited thereto, and a heater 10 in which two or more substrate sets are stacked is also preferable. When two or more substrate sets are stacked, all the positions of the parallel patterns of electrical heating wires may correspond to each other or may be different from each other when seen from the stacking direction. Further, for example, when three substrate sets are stacked, the parallel pattern position of an electrical heating wire 2 included in a first substrate set 7 provided on the lowermost stage and the parallel pattern position of an electrical heating wire included in a third substrate set provided on the uppermost stage may correspond to each other and may be different from the parallel pattern position of the electrical heating wire 12 included in a second substrate set 17 provided on the intermediate stage. Furthermore, a substrate set, which includes a plurality of heater substrates each of which is provided with an electrical heating wire and electrodes, can be used as the substrate set to be stacked.

Meanwhile, when the substrate sets are stacked so that all the positions of the parallel patterns of the parallel circuits of the electrical heating wires 2 included in the plurality of substrate sets are different from each other when seen from the stacking direction, it is preferable that the parallel patterns of the parallel circuits of the electrical heating wires of the respective substrate sets deviate from each other by "(a pitch between rows of the parallel circuit)/(the number of stacked substrate sets)" when seen from the stacking direction. In this case, it is preferable that all the pitches between rows of the parallel circuits of the respective electrical heating wires included in the plurality of substrate sets are equal to each other. When the parallel patterns deviate from each other by "(a pitch between rows of the parallel circuit)/ (the number of stacked substrate sets)", all the electrical heating wires included in the stacked substrate sets are disposed so that a distance between the closest electrical heating wires is constantly positioned. Accordingly, even when the circuit of the electrical heating wire is disconnected at any row, accurate compensation can be performed by the generation of heat from the electrical heating wire positioned closest to the disconnected row. For this reason, a variation in the distribution of heat can be prevented. Therefore, a member to be heated on which the heater 10 is provided can be uniformly heated.

(2) Honeycomb Structure

Figure 10:
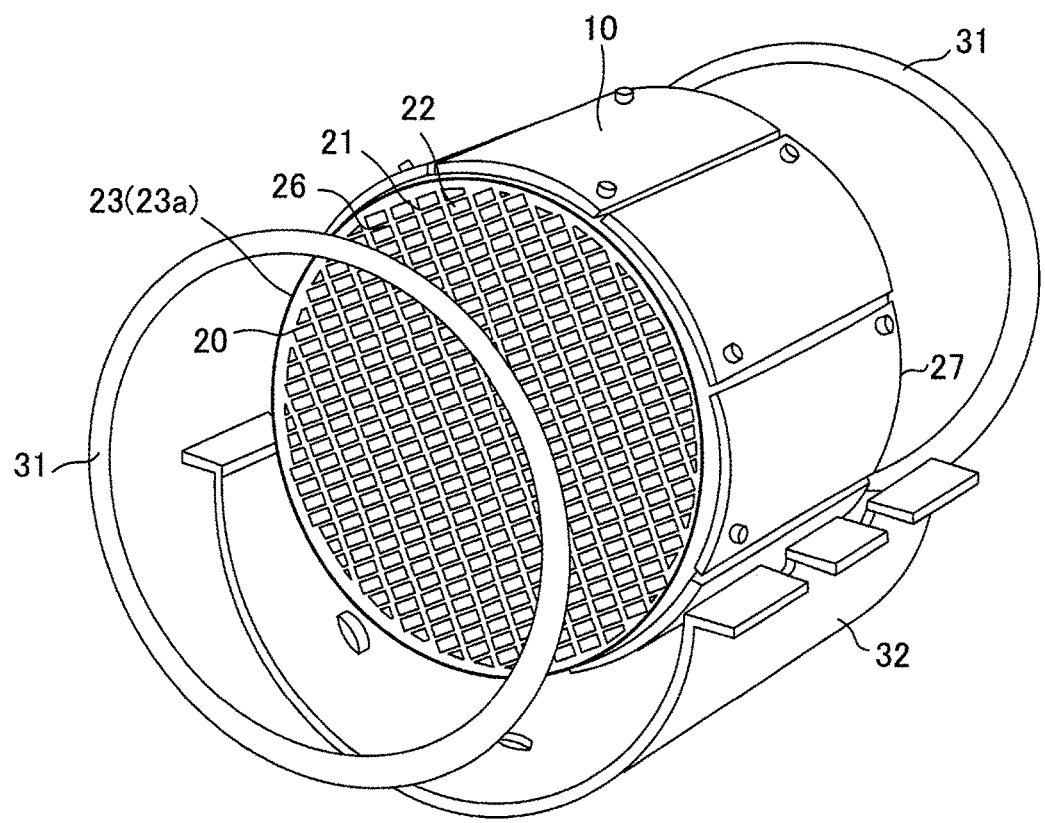
FIG. 10 is a diagram showing an example of a honeycomb structure on which the heaters of the invention are disposed.

FIG. 10 shows an example of a honeycomb structure 20 on which the heaters 10 of the invention are disposed. The honeycomb structure 20 of the invention includes a honeycomb structure 20 that includes partition walls 21 defining a plurality of cells 22 forming channels for fluid and extending from a first end face 26 to a second end face 27, and at least one heater 10 that is provided to surround an outer wall 23 of the honeycomb structure 20. The heaters 10 may be provided on the outer wall 23 of the honeycomb structure 20 of the invention with or without interspace. It is preferable that a plurality of plate-like heaters 10 are provided over the entire circumference of the outer wall 23 of the honeycomb structure 20 without interspace as shown in FIG. 10. Specifically, it is preferable that the second surface 1b of the first heater substrate 1 is formed in a shape along the outer wall 23 of the honeycomb structure 20 and the second surface 1b of the first heater substrate 1 is provided on the outer wall 23. When the heaters 10 are provided on the outer wall 23 without interspace, the honeycomb structure 20 can be uniformly heated. Further, it is preferable that all the heaters 10 to be provided have the same structure (single-substrate heater 10 or stacked heater 10). When all the heaters 10 have the same structure, the honeycomb structure 20 can be uniformly heated.

Furthermore, the honeycomb structure 20 includes a honeycomb base including porous partition walls 21 defining the plurality of cells 22 that form channels for fluid and extend from the first end face 26 to the second end face 27. It is preferable that the partition wall 21 is made of a material including ceramic. Moreover, it is preferable that the material of the partition wall 21 includes at least one kind of ceramic selected from a group consisting of silicon carbide, a silicon-silicon carbide composite material, cordierite, mullite, alumina, spinel, a silicon carbide-cordierite composite material, lithium aluminum silicate, and aluminum titanate. The shape of the cell 22 in the cross-section orthogonal to a direction in which the cell 22 of the honeycomb structure 20 of the invention extends is not particularly limited. For example, cross-sectional shape of the cell 22 includes a polygonal shape, such as a triangular shape, a quadrangular shape, and an octagonal shape, a circular shape, and an elliptical shape. Further, an aspect in which plural shapes of these shapes are combined is also preferable. Examples of the external form of the honeycomb structure 20 (the shape of the entire honeycomb structure 20) is not particularly limited, and can include the shape of a prism of which the bottom has a polygonal shape, such as a round pillar-shaped, the shape of an elliptical column, and the shape of a quadrangular prism. Furthermore, the honeycomb structure 20 of the invention may include a circumferential wall 23a positioned on the outermost circumference. Further, it is preferable that the circumferential wall 23a is an integral wall formed monolithically with a honeycomb formed body during forming. Furthermore, it is also preferable that the circumferential wall 23a is a cement-coated wall that is formed by grinding the circumference of the honeycomb formed body after forming to form the circumference in a predetermined shape and forming the circumferential wall 23a with cement or the like.

When the external form of the honeycomb structure 20 of the invention has a round pillar shape, it is preferable that at least the second surface 1b of the first heater substrate 1 is round so as to have a shape along the outer wall 23. It is preferable that the shape of the heater 10 itself is round as shown in FIG. 10. Meanwhile, in consideration of being provided on a round pillar-shaped member to be heated, the heater 10 shown in FIG. 1 is also round in the shape of an arc so that the second surface 1b of the first heater 10 has a shape along the external form of the round pillar-shaped member to be heated.

Further, ring-shaped pressing members 31 are disposed on both end faces of the honeycomb structure 20 on which the heaters 10 are provided and a support member 32, which is formed along the appearance of the first surfaces 4a of the cover substrates 4 of the heaters 10, is provided as shown in FIG. 10, so that the heaters 10 are fixed to the honeycomb structure 20. Furthermore, since portions of the support member 32 corresponding to the electrode rods 5 of the heaters 10 are opened, the electrode rods 5 can be connected to a power supply.

In addition, it is preferable that a catalyst is loaded on the partition walls 21 of the honeycomb structure 20 on which the heaters 10 of the invention are provided and heated. A method of loading a catalyst component is not particularly limited, and a catalyst can be loaded according to a method that is used in a method of manufacturing a honeycomb catalyser known in the related art. For example, when noble metal, such as Pt, Pd, or Rh, is to be loaded as a catalyst for automotive exhaust gas, the noble metal can be loaded as described below. First, a honeycomb base, which has been subjected to an acid treatment and a heat treatment, is immersed in the slurry of γ-alumina containing "a noble metal catalyst component, such as a chloroplatinic acid aqueous solution" and "rare earth oxide, such as $CeO_2$". Then, it is preferable that the surplus slurry of the honeycomb base, which is coated with the slurry, is removed by air or the like, and the honeycomb base is dried and is used as a honeycomb catalyser. After the honeycomb base is coated with the slurry and surplus slurry is removed by air or the like, the honeycomb base is baked (fired) at a temperature in the range of 500 to 600° C. and then may be used as a honeycomb catalyser. Examples of the catalyst component can include "a three-way catalyst using noble metal, such as Pt, Pd, and Rh, as a base substance", an oxidation catalyst, a deodorizing catalyst, and "a base metal catalyst, such as Mn, Fe, and Cu".

Since an exhaust gas purification system in which a catalyst is loaded on the honeycomb structure 20 provided with the heaters 10 of the invention can maintain the uniform heating of the honeycomb structure 20, a catalyst reaches an activating temperature immediately after the start of an engine and the catalyst having reached the activating temperature is hardly cooled and can maintain catalytic activity even when low-temperature exhaust gas flows in.

(3) Method of Manufacturing Heater

Figure 11:
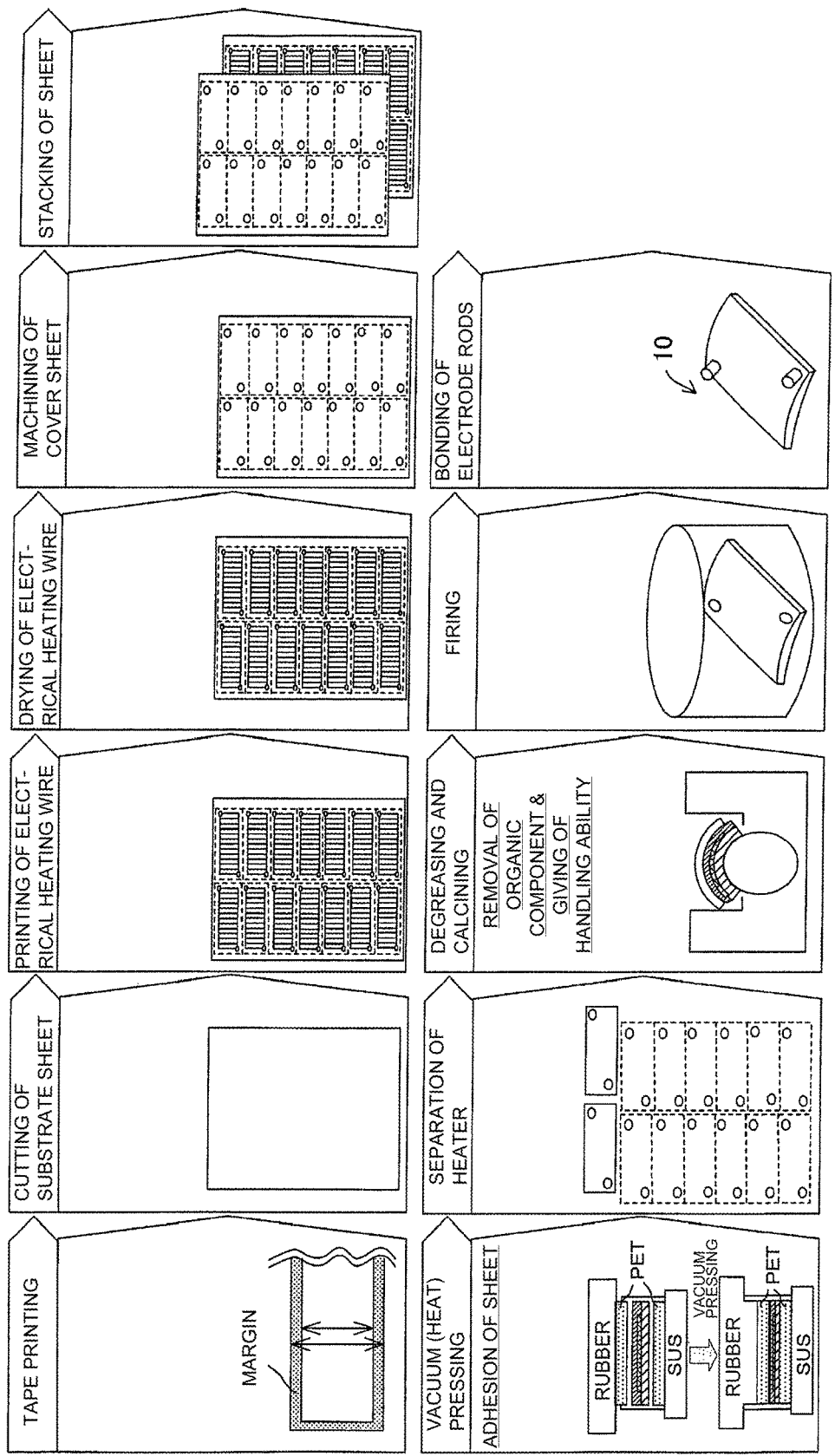
FIG. 11 is a diagram showing an example of a method of manufacturing the heater of the invention.

A method of manufacturing the above-mentioned heater 10 will be described here. FIG. 11 is a diagram showing a method of manufacturing the heater 10 of the invention. Meanwhile, FIG. 11 shows a method of manufacturing the heater 10 in which the cover substrate 4 is disposed on the first heater substrate 1. As shown in FIG. 11, a base sheet forming the first heater substrate 1 is produced first. A base sheet, which is formed of a desired composition (for example, $Si_3N_4$), is formed by tape printing or the like, and is cut to a desired size (for example, width 430×length 180×thickness 0.4). Next, an electrical heating wire 2 having parallel circuits and electrodes 3 are applied and printed on the base sheet to have a desired thickness (for example, 20 to 40 μm), and are dried. It is preferable that a plurality of electrical heating wires 2 are printed on a large base sheet in regard to the printing of the electrical heating wire 2. Next, a cover sheet forming the cover substrate 4 is produced. A cover sheet, which is formed of a desired composition (for example, $Si_3N_4$), is formed by tape printing or the like, and is cut to a desired size. Next, terminal take-out portions of which terminals of the electrodes 3 can be taken out are formed by punching or the like. The base sheet and the cover sheet are stacked, and are bonded to each other by a method, such as vacuum (heat) pressing. Next, the base sheet and the cover sheet are cut and separated into each bonded heater 10 (for each electrical heating wire 2), and each heater 10 is degreased and calcined. Accordingly, organic components contained in the heater 10 can be removed and handling ability can be given to the heater 10. Then, the heater 10, which has been degreased and calcined, is subjected to firing (for example, the heater 10 is fired at 180° C. for 4 hours). After that, the electrode rods 5 are bonded to the cover substrate 4, so that the heater 10 can be produced.

EXAMPLES

The invention will be described in more detail below on the basis of examples, but the invention is not limited to these examples.

Examples 1 to 3 and Comparative Example 1

(Production of Heater)

Heaters 10 were produced. The materials of first heater substrates 1 and cover substrates 4 of heaters 10 of Examples 1 to 3 and Comparative example 1 are $Si_3N_4$. Example 1 included an electrical heating wire 2 that had a width of 400 μm and a thickness of 20 μm and was provided on a first surface 1a of the first heater substrate 1 having a thickness in the range of 0.5 to 1.0 mm in a parallel circuit. Meanwhile, the material of the electrical heating wire 2 was tungsten. The electrical heating wire 2 was provided with a pair of electrodes 3. The cover substrate 4 having a thickness in the range of 0.5 to 1 mm was disposed on the first surface 1a of the first heater substrate 1 provided with the electrical heating wire 2 and the electrodes 3, and electrode rods 5 were formed. The width of the heater 10 of Example 1 was 30 mm, the length thereof was 90 mm, and the thickness thereof was 2.0 mm.

The heater 10 of Example 2 included an electrical heating wire 2 that had a width of 400 μm and a thickness of 10 μm and was provided on a first surface 1a of a first heater substrate 1 having a thickness in the range of 0.33 to 0.67 mm in a parallel circuit. Meanwhile, the material of the electrical heating wire 2 was tungsten, and the electrical heating wire 2 was provided with a pair of electrodes 3. Further, a second heater substrate 11 having a thickness in the range of 0.33 to 0.67 mm was provided on the first surface 1a of the first heater substrate 1 provided with the electrical heating wire 2 and the electrodes 3. An electrical heating wire 12, of which the parallel pattern corresponded to the parallel pattern of the electrical heating wire 2 of the first heater substrate 1 when seen from the stacking direction, and the electrodes 13 were provided on the first surface 11a of the second heater substrate 11. Then, a cover substrate 4 having a thickness in the range of 0.33 to 0.67 mm was disposed thereon, and electrode rods 5 were formed. The width of the stacked heater 10 of Example 2 was 30 mm, the length thereof was 90 mm, and the thickness thereof was 2 mm.

The heater 10 of Example 3 was produced in the same manner as Example 2 except that the heater 10 of Example 3 included an electrical heating wire 12 which was provided on a first surface 11a of a second heater substrate 11 and of which parallel pattern and the parallel pattern of the electrical heating wire 2 of the first heater substrate 1 deviated from each other (deviated from each other by "(a pitch between rows of the parallel circuit)/2") when seen from the stacking direction.

Figure 13:
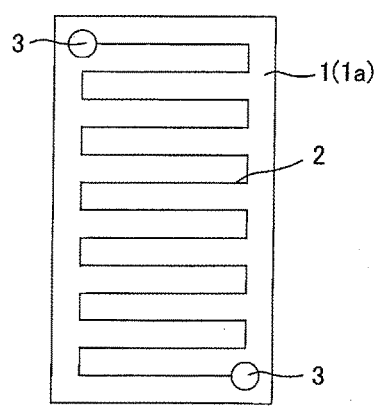
FIG. 13 is a diagram showing an example of a circuit of an electrical heating wire of a heater in the related art.

The heater of Comparative example 1 was produced in the same manner as Example 1 except that the heater of Comparative example 1 included an electrical heating wire 2 provided on a first surface 1a of a first heater substrate 1 in a series circuit as shown in FIG. 13.

(Heat-Generation Temperature Distribution Test of Heater)

The temperature of each of the heaters 10 of Examples 1 to 3 and Comparative example 1, which was obtained when a part of the electrical heating wire of a row of the circuit provided at a portion where the length of the heater 10 was 70 mm (a distance from an end of the heater 10 close to the inlet end face of a honeycomb structure 20 was 70 mm) was disconnected and power of 1.0 kW was applied, was measured. Meanwhile, only the electrical heating wire of the heater 10 of one layer was disconnected in Examples 2 and 3. Measurement results are shown in a graph of FIG. 12.

Figure 12:
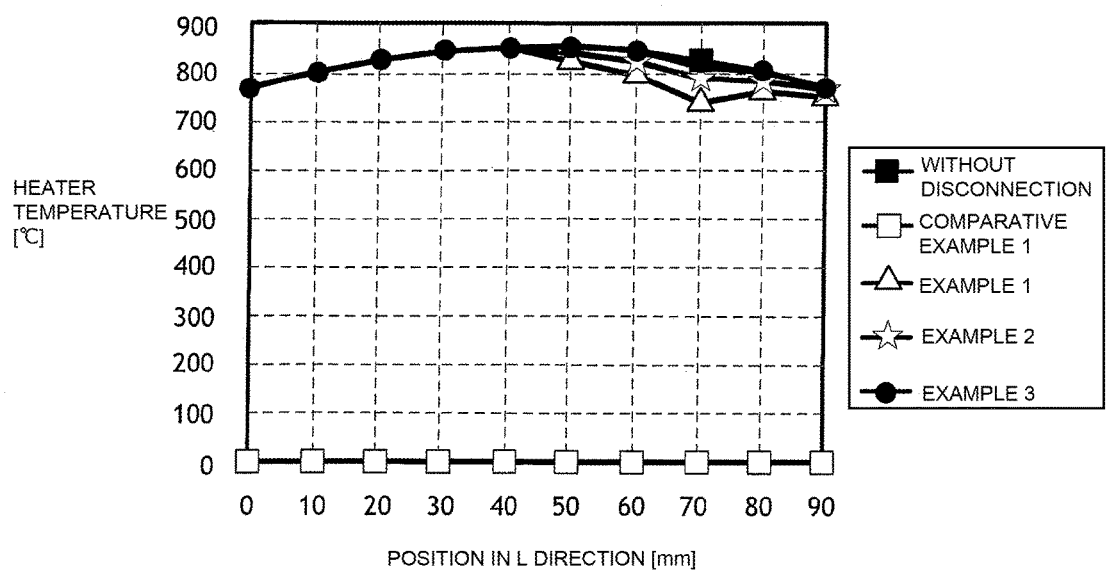
FIG. 12 is a graph showing the results of Examples of the invention.
Figure 14:
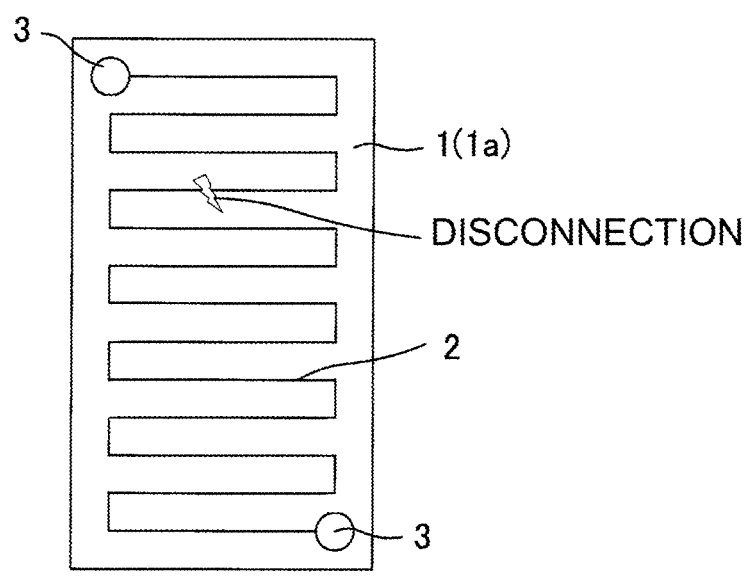
FIG. 14 is a diagram showing an example of an aspect in which a part of an electrical heating wire of the heater in the related art is disconnected.

Since rows of the other circuits allowed current to flow and generated heat even when a part of the electrical heating wire 2 of each of the heaters 10 of Examples 1 to 3 was disconnected, a variation in the distribution of temperature could be reduced as shown in the graph of FIG. 12. On the other hand, since the electrical heating wire 2 of the heater 10 of Comparative example 1 formed a series circuit as shown in FIG. 14, current could not flow in the entire electrical heating wire 2 when a part of the electrical heating wire 2 is disconnected. For this reason, a function as the heater 10 could not be fulfilled.

(Breakage Test of Honeycomb Structure)

Next, a honeycomb structure 20 was heated and tested using the heaters 10 of Examples 1 to 3 and Comparative example 1. A honeycomb structure 20 having the round pillar-shaped external form as shown in FIG. 10 was used as the honeycomb structure 20. The materials of the partition wall 21 and the circumferential wall 23a of the honeycomb structure 20 were a Si—SiC composite material. Further, in regard to the size of the honeycomb structure 20, the diameter of the honeycomb structure 20 was 80 mm, the length of the honeycomb structure 20 in the longitudinal direction was 100 mm, the thickness of the partition wall 21 was 0.15 mm, and the thickness of the circumferential wall 23a was 0.3 mm. Further, the shape of the cell is a square shape, and the density of the cells was 400 cells/$cm^2$.

Eight heaters 10 of each of Examples 1 to 3 and Comparative example 1 were disposed on the circumferential wall 23a of the honeycomb structure 20 with an interval of 5 mm between each heater and each of both end faces of the honeycomb structure 20, and the entire circumference of the honeycomb structure 20 was covered with the heaters 10. Ring-shaped pressing members 31 were disposed on the circumferential walls 23a of both the end faces of the honeycomb structure 20 (on portions corresponding to the interval of 10 mm), and a support member 32 was disposed on the lower portion of the honeycomb structure 20 covered with the heaters 10. Power of 1.0 kW was applied to the electrical heating wires of the eight heaters 10 to heat the honeycomb structure 20 and a breakage test was performed in a state in which a part of the electrical heating wire 2 of a row of the circuit provided at a portion where the length of one of the eight heaters 10 was 70 mm (a distance from an end of the heater 10 close to the inlet end face of the honeycomb structure 20 was 70 mm) was disconnected. Meanwhile, only the electrical heating wire of the heater 10 of one layer was disconnected in Examples 2 and 3. This breakage test was performed five times for every example. The honeycomb structure was changed at every test.

The honeycomb structure 20 provided with the heaters 10 of Example 1 was broken only in one test among the five tests. The honeycomb structure 20 provided with the heaters 10 of each of Examples 2 and 3 was not broken in all the five tests. On the other hand, the honeycomb structure 20 provided with the heaters 10 of Comparative example 1 was broken in all the five tests.

Accordingly, Examples 1 to 3 as the heater 10 of the invention could prevent the breakage of the honeycomb structure 20. On the other hand, the breakage of the honeycomb structure 20 could not be prevented in Comparative example 1 as the heater 10 including the electrical heating wire 2 forming a series circuit.

When the heaters of the invention are provided on a honeycomb structure, the honeycomb structure can be suitably used for the processing of exhaust gas of a gasoline engine, a diesel engine, a combustion device, and the like.

DESCRIPTION OF REFERENCE NUMERALS

1: first heater substrate, 1*a*: first surface (of first heater substrate), 1*b*: second surface (of first heater substrate), 2: electrical heating wire (provided on first heater substrate), 3: electrode (provided on first heater substrate), 4: cover substrate, 4*a*: first surface (of cover substrate), 4*b*: second surface (of cover substrate), 5: electrode rod, 7: first substrate set, 10: heater, 11: second heater substrate, 11*a*: first surface (of second heater substrate), 11*b*: second surface (of second heater substrate), 12: electrical heating wire (provided on second heater substrate), 13: electrode (provided on second heater substrate), 14: cover substrate (of second substrate set), 14*a*: first surface (of cover substrate of second substrate set), 14*b*: second surface (of cover substrate of second substrate set), 17: second substrate set, 20: honeycomb structure, 21: partition wall, 22: cell, 23: outer wall, 23*a*: circumferential wall, 26: first end face, 27: second end face, 31: pressing member, 32: support member

What is claimed is:

1. A heater comprising:
   a plate-like first heater substrate;
   an electrical heating wire that is provided on a first surface of the first heater substrate, wherein the electrical heating wire comprises a plurality of wire segments that are arranged in a parallel circuit;
   electrodes that are connected to the electrical heating wire to allow current to flow in the electrical heating wire; and
   a plate-like cover substrate that covers the first surface of the first heater substrate, the electrical heating wire, and the electrodes with a second surface of the cover substrate,
   wherein the electrical heating wire generates heat, so that the amount of heat is supplied.

2. The heater according to claim 1,
   wherein the first heater substrate and/or the cover substrate contain $Si_3N_4$ or $Al_2O_3$.

3. The heater according to claim 1,
   wherein the electrical heating wire contains at least one kind of metal selected from a group consisting of WC, TiN, TaC, ZrN, $MoSi_2$, Pt, Ru, and W.

4. The heater according to claim 3,
   wherein the first heater substrate and/or the cover substrate contain $Si_3N_4$, the electrical heating wire contains the metal and $Si_3N_4$, and the volume resistivity of the electrical heating wire is in the range of $4.0 \times 10^{-5}$ to $2.0 \times 10^{-4}$ Ωcm.

5. The heater according to claim 3,
   wherein the first heater substrate and/or the cover substrate contain $Si_3N_4$, the electrical heating wire contains the metal and $Si_3N_4$, and the thermal expansion coefficient of the electrical heating wire is in the range of 3.1 to 7.1 ppm/K.

6. The heater according to claim 1,
   wherein the first heater substrate, the electrical heating wire provided on the first heater substrate, and the electrodes form a first substrate set, one or more substrate sets each of which is the same as the first substrate set are stacked on the first substrate set, and the cover substrate is provided on the substrate sets, or the first heater substrate, the electrical heating wire provided on the first heater substrate, the electrodes, and the cover substrate form a first substrate set, and the first substrate sets are stacked.

7. The heater according to claim 6,
   wherein a position of a parallel pattern of the parallel circuit of the electrical heating wire of the substrate set provided on the first substrate set corresponds to a position of a parallel pattern of an electrical heating wire of a substrate set provided on the first heater substrate when seen from a stacking direction.

8. The heater according to claim 6,
   wherein positions of parallel patterns of the parallel circuits of the electrical heating wires of the respective substrate sets deviate from each other when seen from a stacking direction.

9. The heater according to claim 8,
   wherein the parallel patterns of the parallel circuits of the electrical heating wires of the respective substrate sets deviate from each other by "(a pitch between rows of the parallel circuit)/(the number of stacked substrate sets)" when seen from the stacking direction.

10. A honeycomb structure including the heater according to claim 1, the honeycomb structure comprising:
    a honeycomb structure that includes partition walls defining a plurality of cells forming a channel for fluid and extending from a first end face to a second end face; and
    at least one heater that is provided so as to surround an outer wall of the honeycomb structure.

11. The honeycomb structure according to claim 10,
    wherein a catalyst is loaded on the partition walls of the honeycomb structure.

* * * * *